United States Patent
Wakiyama et al.

[15] 3,689,582
[45] Sept. 5, 1972

[54] PROCESS FOR RECOVERING DICHLOROETHANE IN OXYCHLORINATION PROCESS

[72] Inventors: Satoshi Wakiyama; Kyoichi Hori, both of Yamaguchi, Japan

[73] Assignee: Toyo Soda Manufacturing Co., Ltd., Yamaguchi, Japan

[22] Filed: July 29, 1968

[21] Appl. No.: 748,322

[30] Foreign Application Priority Data

Aug. 16, 1967 Japan ..................42/52595

[52] U.S. Cl..................260/659 A, 260/652 P, 55/71
[51] Int. Cl.............................................C07c 17/02

[58] Field of Search............260/652 P, 659 A; 55/71

[56] References Cited

UNITED STATES PATENTS 3,488,398    1/1970    Harpring et al........260/659 A

*Primary Examiner*—Leon Zitver
*Assistant Examiner*—Joseph A. Boska
*Attorney*—Sughrue, Rothwell, Mion, Zinn & Macpeak

[57] ABSTRACT

A process for recovering dichloroethane produced by the oxychlorination of ethylene in air whereby a dichloroethane is absorbed into an alkyl benzene absorbent.

3 Claims, 1 Drawing Figure

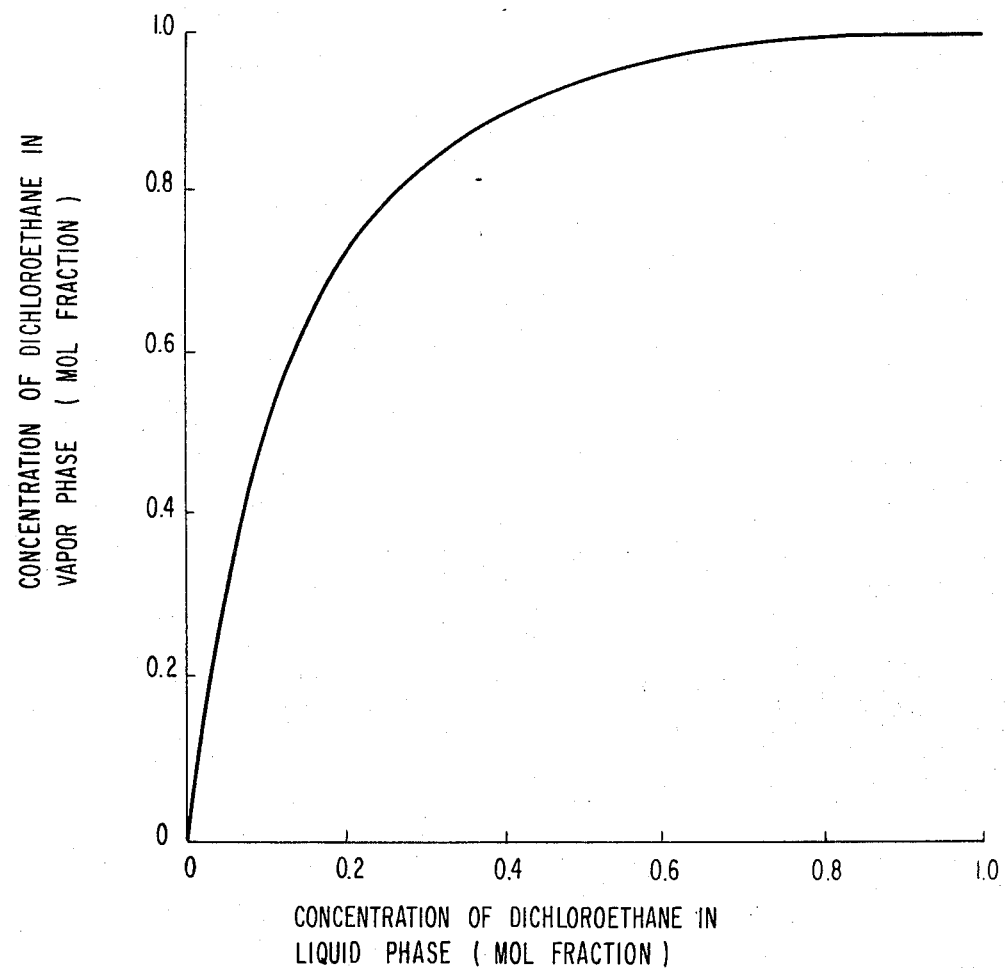

PROCESS FOR RECOVERING DICHLOROETHANE IN OXYCHLORINATION PROCESS

BACKGROUND OF THE INVENTION

1. Field of the Invention

The present invention relates to a process for producing dichloroethane in high yields, and more particularly to a method of oxychlorination of ethylene whereby air is used as the oxygen source.

2. Description of Prior Art

Generally, dichloroethane is produced by oxychlorination of ethylene by a catalytic gaseous reaction of ethylene, hydrogen chloride and oxygen or air, which can be represented by the formulas:

$$C_2H_4 + 2HCl + \tfrac{1}{2}O_2 \rightarrow C_2H_4Cl_2 + H_2O$$

Commercially, oxygen is used in an excess amount and for economic reasons is normally supplied in the form of air.

When air is used as the source of oxygen, it contains about four times the quantity of nitrogen than oxygen, therefore the ration of dichloroethane and water against the gaseous reaction product will be theoretically about 1:2, if the reaction is perfectly performed. However, as air is practically used in excess, and carbon dioxide will be produced by side reaction, the volume of dichloroethane and water will be less than one half of the gaseous reaction product.

In other words, when using air as the oxygen source, the reaction products, dichloroethane and water, are introduced into the purification step together with large quantities of inert gas which has a greater volume than that of the reaction products themselves. Since dichloroethane is usually collected by ordinary condensation with cooling water, a considerable amount of dichlorethane remains uncondensed due to the presence of the inert gas. To discharge this uncondensed dichloroethane outside of the reaction system results in significant deterioration of the yield.

It would be desirable therefore to provide a means for recovering dichloroethane by some other technique besides condensation so that air can be used as the oxygen source without reducing the ultimate yield. One good technique would be to absorb dichloroethane into a suitable absorbent.

A suitable absorbent must possess the following characteristics, however:

1. It must not be reactive with dichloroethane.
2. Vapors of dichloroethane must be dissolved into the material.
3. It must not form an azeotropic mixture with dichloroethane.
4. It must have a good thermal stability.
5. It should have a reasonably low vapor pressure, otherwise it is difficult to separate the dichloroethane. Further, a high vapor pressure results in loss of absorbent during absorption.
6. Its boiling point should not be excessively high, otherwise a special heating source or a device of pressure reduction must be employed to separate the dichloroethane.
7. Boiling should occur within a narrow range to prevent any significant variation in operating conditions with time.
8. The material should be inexpensive.

Although various types of kerosene have been frequently used as absorbents for hydrocarbons due to their low cost, their boiling range is too broad. Moreover, kerosenes contain components whose boiling points overlap the boiling range of dichloroethane which makes separation difficult and the thermal stability of kerosene is unacceptably poor.

SUMMARY OF INVENTION

It has been discovered that alkylbenzene having a boiling point within the range of 130°–190°C. satisfies the requirements of a dichloroethane absorbent.

BRIEF DESCRIPTION OF DRAWINGS

The FIGURE is a graph of the mol fraction of dichloroethane in the vapor phase versus the mol fraction of dichloroethane in the liquid phase.

DETAILED DESCRIPTION OF PREFERRED EMBODIMENTS

Suitable types of alkylbenzene, within the scope of this invention include ethylbenzene, xylen, propylbenzene, trimethylbenzene, ethyltoluene, butylbenzene and diethylbenzene.

These species are free from unsaturated side chains, are not reactive with dichloroethane, and are highly stable. Further, the solubility of dichloroethane vapor into alkylbenzene is high; for example, a mixture of alkylbenzene having a boiling point in the range of 145° to 165°C. is shown below:

The concentration of dichloroethane in the solution is 27 percent by weight when dichloroethane vapor has 30 mm Hg of partial pressure at 30°C.

| Composition (molar percent): | |
|---|---|
| ethylbenzene } | |
| p-xylene } | 4 |
| m-xylene } | |
| o-xylene } | |
| | 42 |
| n-propylbenzene } | |
| cumene | 1 |
| p-ethyltoluene | 24 |
| 1,3,5-trimethylbenzene } | |
| tert-butylbenzene } | 11 |
| sec-butylbenzene } | |
| 1,2,4-trimethylbenzene } | |
| | 13 |
| 1,3-diethylbenzene } | |
| other components | 5 |

Moreover, an alkylbenzene absorbent can be readily separated from the dichloroethane by distillation.

As one example, a vapor-liquid equilibrium of dichloroethane and an alkylbenzene mixture, having a boiling range of from 160° to 180°C. and the following composition is set forth in an attached drawing.

| Composition (molar percent) | |
|---|---|
| o-xylene } | |
| | 8 |
| n-propylbenzene } | |
| cumene | 4 |
| p-ethyltoluene | 13 |
| 1,3,5-trimethylbenzene } | |
| tert-butylbenzene } | 11 |
| sec-butylbenzene } | |
| 1,2,4-trimethylbenzene } | |
| | 43 |
| 1,3-diethylbenzene } | |
| 1,2,3-trimethylbenzene } | 10 |
| n-butylbenzene } | |
| | 1 |
| 1,4-diethylbenzene } | |
| other components | 10 |

Further, these absorbents have a very high thermal stability. As one example, an alkylbenzene mixture having a boiling range of from 160° to 190°C. and having the following composition was mixed with 5 percent (by weight) of dichloroethane. The resulting mixture in an iron container fitted with a reflux condenser was kept under boiling conditions at normal pressure. At the end of 500 hours, the solution was almost unchanged.

| Composition: (molar percent) | |
|---|---|
| o-xylene<br>n-propylbenzene | 7 |
| cumene | 3 |
| p-ethyltoluene | 12 |
| 1,2,5-trimethylbenzene<br>tert-butylbenzene<br>sec-butylbenzene<br>1,2,4-trimethylbenzene | 10 |
| 1,3-diethylbenzene<br>1,2,3-trimethylbenzene<br>n-butylbenzene | 40 |
| | 9 |
| 1,4-diethylbenzene<br>p-tert-butyltoluene | 3 |
| | 2 |
| other components | 14 |

For the sake of comparison, kerosene having a boiling range of from 160° to 190°C. was prepared and the same experiment was conducted. At the end of 500 hours, the solution was significantly colored and the formation of tarry substance appeared. Moreover, the concentration of dichloroethane had decreased to about 1.5 percent (by weight) from the original 5 percent.

Although the above examples were shown with alkylbenzene mixtures, it should be understood that similar results are obtainable with only one species of alkylbenzene alone. For economic reasons, one convenient source of alkylbenzene is the mixture resulting from the separation of benzene and toluene or the like in a Udex petrochemical plant. This mixture is generally adequate and it is of low cost.

According to this invention, dichloroethane is first produced by the oxychlorination reaction of ethylene, hydrogen chloride and oxygen in the form of air. The product resulting from this reaction is condensed in a suitable condensor and the uncondensed dichloroethane product is fed into an absorbing column where it is absorbed into an alkyl benzene absorbent.

While this invention has greatest applicability to recovery of dichloroethane where the oxychlorinating reaction is conducted in air, it should be understood that under special circumstances, this technique can be used where the oxygen source is pure oxygen.

This invention can be further understood by reference to the following examples.

EXAMPLE 1

Oxychlorinating reaction was carried out by using approximately stoichiometric amounts of ethylene, hydrogen chloride and air. This gaseous reaction product was cooled at a temperature of 30°C. under a pressure of 2 kg/cm²G and dichloroethane and water were condensed.

Uncondensed gas was passed through a neutralization equipment and introduced into an absorption and desorption system, which consists of an absorption column kept at a pressure of 2 kg/cm²G (a temperature at the top of column: 30°C.) and a desorption column kept at normal pressure.

The concentration of dichloroethane in the above gas was about 4.5 molar percent and the dichloroethane was equal to about 9 percent of the dichloroethane which was produced in the aforesaid oxychlorinating reaction.

Cumene having a boiling point of 152°C. was used as an absorbent.

Dichloroethane dissolved in the absorbent was almost completely distilled in the desorption column. The absorbent obtained from the bottom of the desorption column was poured into the top end of the absorption column.

The concentration of dichloroethane in the inert gas which was exhausted from the top end of the absorption column was 0.0015 molar percent or less.

The loss of dichloroethane was 0.0030 percent or less of the amount of dichloroethane actually produced by the reaction.

A loss of the absorbent which was attendant with the inert gas in the same place was 7.5 percent or less (by weight) of the amount of dichloroethane collected in the desorption column.

The absorption after the continuous operation during 2,000 hours showed a boiling point of 153°C. and deterioration of the absorbent was negligible.

EXAMPLE 2

The same gas, similar to that in Example 1 was introduced in the same absorption and desorption which was used in Example 1. An alkylbenzene mixture having a boiling range of from 135° to 160°C. and having the following composition was used as an absorbent.

| Composition: (molar percent) | |
|---|---|
| ethylbenzene<br>p-xylene<br>m-xylene<br>o-xylene<br>n-propylbenzene | 11 |
| | 85 |
| cumene | 2 |
| other components | 2 |

Dichloroethane dissolved in the absorbent was almost completely distilled at the desorption column and the absorbent obtained at the bottom of the desorption column was poured into the top end of the absorption column.

Dichloroethane which was contained in the inert gas and exhausted from the top end of the absorption column showed a concentration of 0.0020 molar percent or less.

The loss of this dichloroethane was equal to 0.0035 percent or less of dichloroethane which was produced in the reaction.

The loss of the absorbent was equal to 9 percent or less (by weight) of the dichloroethane which was collected in the desorption column.

The boiling point of the absorbent after continuous operation during 2,000 hours showed a range of from 140° to 162°C. and the deterioration of the absorbent was negligible.

EXAMPLE 3

Ethylene, hydrogen chloride and air were reacted in about stoichiometric amounts. The resulting dichloroethane was first cooled to a temperature of 30°C. under normal pressure and thereby dichloroethane and water were condensed.

Uncondensed gas was passed through neutralization equipment and was introduced into the absorption and desorption system which consists of an absorption column (a temperature at the top end: 30°C.) maintained at normal pressure and a desorption column kept at normal pressure. Dichloroethane in this gas was present in a concentration of about 13 molar percent, and was equal to about 30 percent of the dichloroethane produced by the reaction.

A mixture of alkylbenzene which has a boiling point range of from 145° to 175°C. and the following composition was used as an absorbent and recurred in the absorption and desorption system.

| Composition: (molar percent) | |
|---|---|
| ethylbenzene } | |
| p-xylene } | 3 |
| m-xylene } | |
| o-xylene } | |
| } | 41 |
| n-propylbenzene } | |
| cumene | 1 |
| p-ethyltoluene | 22 |
| 1,3,5-trimethylbenzene } | |
| tert-butylbenzene } | 10 |
| sec-butylbenzene } | |
| 1,2,4-trimethylbenzene } | |
| } | 12 |
| 1,3-diethylbenzene } | |
| 1,2,3-trimethylbenzene | 3 |
| other components | 8 |

Dichloroethane dissolved in the absorbent was almost completely distilled at the desorption column and the absorbent obtained at the bottom of the desorption column was poured into the top end of the absorption column.

The dichloroethane in the inert gas which was exhausted from the top end of the absorption column showed a concentration of 0.0030 molar percent or less.

The loss of dichloroethane was equal to 0.0060 percent or less, of the total amount of dichloroethane produced by this reaction.

The loss in the absorbent was equal to 5.0 percent or less (by weight) of the dichloroethane which was collected in the desorption column.

The absorbent after continuous operation for 2,000 hours showed a boiling point range of from 148° to 177°C. and negligible deterioration.

EXAMPLE 4

The same gas which was used in Example 3 was introduced into the absorption and desorption system, in conformity to the process in Example 3.

A mixture of alkylbenzenes which has a boiling point range of from 160° to 190°C., and the following composition was used as an absorbent and introduced into the absorption and desorption system.

| Composition: (molar percent) | |
|---|---|
| o-xylene } | |
| } | 7 |
| n-propylbenzene } | |
| cumene | 3 |
| p-ethyltoluene } | 12 |
| 1,3,5-trimethylbenzene } | |
| tert-butylbenzene } | 10 |
| sec-butylbenzene } | |
| 1,2,4-trimethylbenzene } | |
| } | 40 |
| 1,3-diethylbenzene } | |
| 1,2,3-trimethylbenzene } | 9 |
| n-butylbenzene } | |
| } | 3 |
| 1,4-diethylbenzene } | |
| p-tert-butyltoluene | 2 |
| other components | 14 |

Dichloroethane dissolved in the absorbent was almost completely distilled at the desorption column and the absorbent obtained at the bottom of desorption column was poured into the top end of the absorption column.

Dichloroethane in the inert gas exhausted from the top end of the absorption column showed a concentration of 0.0015 molar percent or less. The loss of dichloroethane was equal to 0.0030 percent or less of dichloroethane which was produced in this reaction. The loss in the absorbent was equal to 2.5 percent or less (by weight) of dichloroethane which was collected in the desorption column.

The absorbent after continuous operation for 2,000 hours showed a boiling point range of from 162° to 193°C. and a negligible deterioration.

EXAMPLE 5

The same effect as in Example 1 was obtained when the same gas as Example 1 was introduced into the absorption and desorption system by use of ethylbenzene (boiling point 136°C.), o-xylene (boiling point 144°C.), and p-ethyltoluene (boiling point 162°C.) respectively as absorbent.

While the invention has been particularly shown and described with reference to preferred embodiments thereof, it will be understood by those skilled in the art that various changes in form and details may be made therein without departing from the spirit and scope of the invention.

What is claimed is:

1. In an oxychlorination process for producing dichloroethane comprising reacting hydrogen chloride, ethylene and oxygen in approximately stoichiometric amounts, the improvement which comprises recovering dichloroethane from the gaseous reaction product containing dichloroethane removed from the reaction zone after condensing and separating therefrom as much dichloroethane as possible by contacting the resulting gaseous reaction product containing any uncondensed dichloroethane with a liquid alkyl benzene absorbent having a boiling point within the range of 135°C and 180°C selected from the group consisting of ethyl benzene, xylene, cumene, propyl benzene, butyl benzene, diethyl benzene, trimethyl benzene, ethyl toluene and mixtures thereof and thereafter distilling dichloroethane absorbed in said absorbent from said absorbent.

2. The process of claim 1 wherein said resulting gaseous reaction product containing any uncondensed dichloroethane is contacted with said liquid alkyl benzene absorbent at a temperature of about 30°C at a pressure of from normal to 3 Kg/cm$^2$G.

3. The process of claim 1 wherein said oxygen is supplied to said reaction in the form of air.

* * * * *